Oct. 18, 1966     P. J. CREIGHTON ETAL     3,280,010

FORCED FRACTIONATOR COLUMN-THERMOSYPHON REBOILER

Filed April 12, 1963

Peter J. Creighton
Robert P. Cahn

Inventors

By

Patent Agent

United States Patent Office 3,280,010
Patented Oct. 18, 1966

3,280,010
FORCED FRACTIONATOR COLUMN-
THERMOSYPHON REBOILER
Peter J. Creighton, Morristown, and Robert P. Cahn, Millburn, N.J., assignors to Esso Research and Engineering Company, a corporation of Delaware
Filed Apr. 12, 1963, Ser. No. 272,672
6 Claims. (Cl. 203—95)

This invention relates to the use of vapor-actuated pumping devices to enhance the operation of fractionation and stripping systems which employ direct column injection of vapor streams.

More particularly, the invention relates to the use of a vapor-actuated pumping device, such as an injector, diffusor, or eductor located in the bottoms return line of a fractionation or stripping column whereby a pressurized vapor stream is introduced into the pumping device, intimately mixes with the inflowing bottoms liquid, and forces the mixture through a reboiler, thermosyphon reboiler or reboiler bypass line and thence back into the column's bottom section at an increased velocity and temperature.

Conventional thermosyphon reboilers have increasingly replaced kettle-type reboilers for use with fractionating columns and stripping columns due to the improved heat transfer experienced with their use and the fact that they frequently eliminate the need for a pump. However, serious and costly design problems are encountered with the application of thermosyphon reboilers due to the fact that the fractionating column must be elevated about fifteen feet above grade to insure an adequate liquid head to operate the reboiler.

Further problems exist in fractionation systems which employ the use of heavy slurries of inorganic salts or selective adsorbents to enhance component separation or reaction within the fractionation column. When utilizing conventional gravity flow fractionation tower-thermosyphon reboiler systems, the heavy slurries tend to restrict the flow in the gravity reboiler circuit by collecting at low spots in the reboiler return line and clogging the reboiler tubes due to the low velocity of the reboiler stream. Mechanical pumping of the slurries to increase the stream velocity presents serious problems in that the pumps suffer extreme amounts of mechanical attrition due to the abrasive slurries.

It is, therefore, the principal object of the present invention to provide a means whereby the operation of fractionation column-thermosyphon reboiler systems which employ the use of open steam or other extraneous gaseous streams within the fractionator may be enhanced.

Another object of the present invention is to provide means whereby heavy solid-liquid slurries used in fractionation-reaction operations can be effectively pumped from the fractionation column and through the reboiler without maintaining expensive pumping installations or inefficient gravity flow systems.

There are many petroleum and chemical processes which employ conventional fractionation column-thermosyphon reboiler apparatus and also use direct column injected high temperature, high pressure vapor streams to provide process heat requirements or to alter overhead product composition or yield by changing the effective pressure within the column. For example, in alcohol-water stripping operations, a portion of the fractionation heat requirements is often provided by directly injecting open steam into the alcohol-water mixture contained in the bottoms section of the fractionation column. Additionally, in certain hydrocarbon distillations, $C_3$ to $C_8$ hydrocarbon vapors are often injected into the bottoms section of the fractionation tower to aid in the separation of high and low boiling products.

Also, in some hydrocarbon stripping operations, steam is frequently injected into the bottom of the stripping column to assist in the overhead removal of undesirable light components introduced with the feed. This is frequently the case in pipestills, pipestill sidestream strippers, etc. In many of these operations, some reboiling is also desirable to achieve sharp separation. These reboiled sidestream strippers are particularly useful in crude oil distillation units.

In accordance with the objects of the instant invention, pump and gravity flow systems used in conjunction with fractionation and stripping columns and thermosyphon reboilers can be eliminated or significantly reduced in size and considerbale savings on pumps, maintenance, and construction realized by directing steam, hydrocarbons, and other extraneous streams which are normally injected directly into the column to enhance its operation, into a vapor-actuated pumping device located upstream from the reboiler, thus serving to pump the bottoms product through the reboiler. An additional benefit derived from this system is a reduction in the heat transfer area required in the reboiler. This effect is achieved due to the fact that the increased velocity of the bottoms product resulting from the injected vapor increases the reboiler heat transfer coefficient and secondly, materially diminishes the reboiler tube fouling rate.

Utilizing the system of the instant invention, almost all types of liquids and liquid-solid mixtures can be effectively pumped by the vapor-actuated pumping device from the bottoms section of the fractionator through the reboiler and then back again into the fractionator at an increased temperature and velocity. The design and efficiency of a vapor-actuated pumping device depends upon a variety of process variables such as solution density and viscosity, actuating fluid pressure, solution pressure of the liquid being pumped, and the solution throughput desired. However, the exact design of the vapor-actuated pumping device and actuating fluid pressure necessary for a given process situation can be determined using methods widely known in the art. For example, design principles are adequately set forth in "Chemical Process Principles," Part II, Thermodynamics by O. A. Hougen, K. M. Watson and R. A. Ragatz, 2nd edition, John Wiley & Sons, New York 1959, pages 715–722, and Transport Phenomena by R. B. Bird, W. E. Stewart, and E. N. Lightoot, John Wiley & Sons, New York 1960, pages 220–222 and pages 470–471.

Although the invention is not specifically limited thereto, the type of vapor-actuated pumping devices which are of utility in the instant invention are those which, like the injector, diffusor or eductor, have no moving parts for driving the pumped liquid and which comingle the pumped liquid with the vapor which serves as the driving medium. It should be understood that the mixing pumps may optionally be provided with adjustable means for controlling the flow of fluids to maintain an efficient vapor-liquid ratio and that vaporization or condensation of either or both fluids may take place.

The nature of the invention and the manner in which the process can be conducted will be better understood when reference is made to the accompanying drawings.

Figure 1:
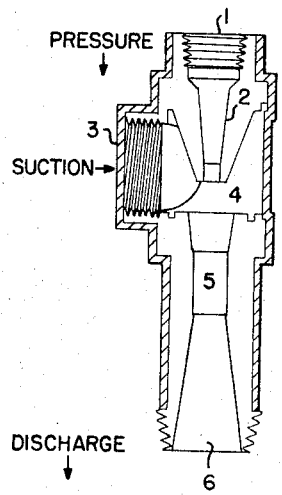
FIGURE 1 is a cross-sectional view of a conventional static, vapor-actuated mixing pump.

The vapor-actuated mixing pump illustrated in FIGURE 1 comprises actuating fluid inlet 1, actuating fluid nozzle 2, suction inlet 3, suction and mixing chamber 4, diffusor 5, and discharge outlet 6. In the operation contemplated by the instant invention, the actuating fluids, such as steam, vaporous hydrocarbons or other fluids which are normally injected directly into the fractionation tower to provide fractionation heat requirements or to adjust the partial pressures to effect a more desirable overhead composition or yield, is by the present invention injected into actuating fluid inlet 1 and is expanded by means of nozzle 2 from its initial pressure to a pressure essentially equal to that of the bottoms product entering at suction inlet 3. In the process of being expanded, the actuating fluid is accelerated from its initial entrance velocity, which is negligibly small, to a high velocity. In the suction chamber 4, the actuating fluid induces a region of low pressure-high velocity flow which causes the bottoms product to become entrained and mixed with the actuating fluid. During the mixing process, the actuating fluid is retarded and the secondary fluid (bottoms product) is accelerated. Following the mixing process, the mixture enters the diffusor section 5 where the cross-section of the flowing stream is first rapidly diminished and then rapidly increased to compress the mixture to the exit pressure by means of rapid deceleration. From the diffusor section 5, the mixture enters the reboiler or reboiler bypass conduit through discharge outlet 6.

Figure 2:
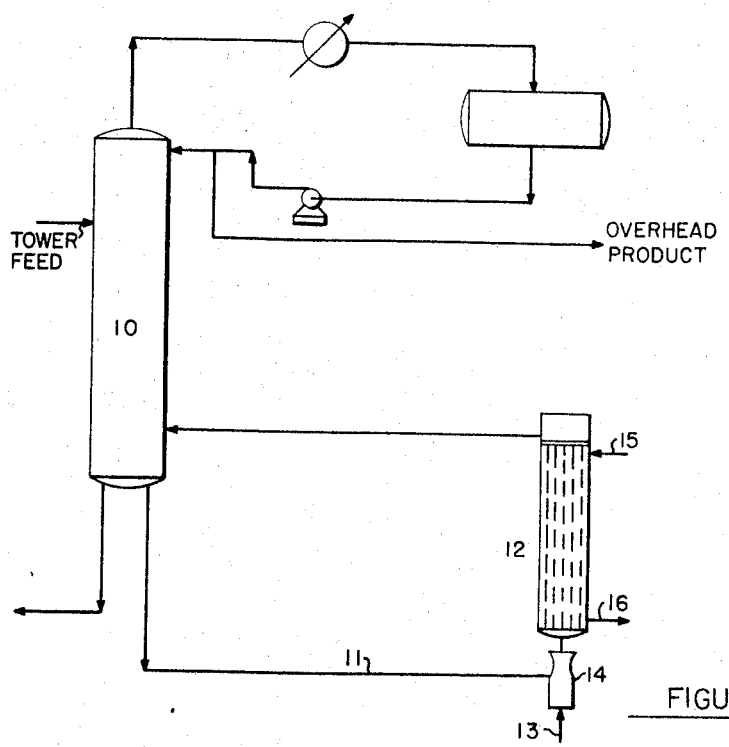
FIGURE 2 is a schematic diagram of the bottom section of a fractionation column, vapor-actuated mixing pump, and thermosyphon reboiler system.

FIGURE 2 illustrates the operation of the basic process apparatus. Although the system of the instant invention may be advantageously used to improve the operation of any fractionator-thermosyphon reboiler system which employs a directly injected vapor stream, reference is drawn in the description of FIGURE 2, to a hydrocarbon fractionation using a $C_5$ to $C_8$ hydrocarbon vapor-actuating fluid.

Referring to FIGURE 2, a bottoms stream is withdrawn from fractionator 10 and enters the reboiler circuit by means of conduit 11. In the case of the present embodiment, a $C_5$ to $C_8$ hydrocarbon vapor (actuating fluid) is injected upstream of the reboiler 12 by means of actuating fluid conduit 13 and expanded through an eductor 14. The actuating fluid expansion causes the fractionator bottoms product to be educted into the diffusor section of eductor 14 and forced at an increased velocity into the heating tubes of reboiler 12. Additional pumping effect is obtained from the lift resulting from the decreased density of the combined streams. The over-all pumping action reduces or eliminates the required elevation of the column above the reboiler for normal gravity flow systems and also obviates the need of expensive pumping installation where the column is only slightly elevated above the reboiler. Heating fluid is provided in the reboiler space surrounding the tubes by conduit 15 and is returned by conduit 16.

It should be understood that indicating and control equipment for flow, level, temperature and pressure have been omitted from the drawings for the sake of simplicity and clarity.

The following is a representative example of the operation of the system of the instant invention.

A process design study was made to determine the effect of using the present invention with a commercial process which normally utilizes direct column injected steam to supply a portion of the process latent heat requirements. In the system studied, it is desired to separate an aqueous formaldehyde solution from a solution of formaldehyde, water, and heavy organic compounds. The operation is carried out in a 20-plate distillation column operating at 35–40 p.s.i.g. with 42% of the reboiler latent heat requirements supplied as open steam directly into the column, and 58% as indirect heat through the reboiler surface.

The following table summarizes the material balance for this operation.

| Component | Feed (mols/hr.) | Over-head (mols/hr.) | Open Steam (mols/hr.) | Bottoms (mols/hr.) |
|---|---|---|---|---|
| Formaldehyde | 18.0 | 18.0 | | |
| Water | 450.0 | 331.4 | 226.0 | 344.6 |
| Heavy Organic Compound | 20.5 | | | 20.5 |
| | 488.5 | 349.4 | 226.0 | 365.1 |
| Temperature, °F | 197 | 125 | 344 | 287 |

The following table compares the reboiler surface requirements and the tower elevation above the grade for two cases. Case I is the conventional design, where the 125 p.s.i.g. open steam is injected directly into the bottom of the fractionating tower below the bottom plate. In Case II, according to the principles of the present invention, the steam is injected into an eductor upstream of the reboiler. In both Cases I and II a thermosyphon reboiler has been specified.

COMPARISON OF CONVENTIONAL SYSTEM AND PRESENT INVENTION

| Case No | I | II |
|---|---|---|
| Type of Reboiler | Thermosyphon | Thermosyphon. |
| Steam Injection | Directly into Column Bottom. | Into Eductor Upstream of Reboiler. |
| Reboiler Duty, mm. B.t.u./hr | 5.84 | 5.84. |
| Reboiler Surface, sq. ft | 837 | 584. |
| Elevation of Tower, above grade, ft. | 12 | As necessary for piping (about 5 ft.). |

From the above data, it can be readily seen that reboiler surface requirements and tower elevation are markedly diminished using the process and apparatus of the instant invention. Considering that process reboilers are normally constructed of expensive alloy materials and that tower elevation introduces structural complications, it can be understood that appreciable savings can be realized using the system of this invention.

Having thus described the preferred embodiments of the present invention, it is understood that it embraces such other variations and modifications as come within the spirit and scope thereof. The invention is defined by the claims appended hereto.

What is claimed is:

1. In a fractionator column-thermosyphon reboiler system wherein an aqueous formaldehyde solution is separated from a solution of formaldehyde, water and heavy organic compounds using a fractionation tower opreating at 35–40 p.s.i.g. and removing the aqueous formaldehyde as an overhead product and where a portion of the fractionator bottoms product is removed from the bottom of the fractionator and recycled as a reboiler return stream by means of an eductor having in an essentially straight linear flow line an actuating fluid inlet, a mixing chamber, a diffuser chamber and a discharge outlet, and comprising a suction inlet communicating with the mixing chamber and intersecting said flow line, the improvement which comprises introducing said reboiler return stream into the suction inlet of said mixing chamber of the eductor and transversely to the flow line upstream of said reboiler, directly injecting a condensable vapor into said actuating fluid inlet, mixing said condensable vapor and reboiler return stream in said mixing chamber of the eductor, withdrawing the resultant mixture from said eductor at an increased velocity, and introducing the mixture of condensable vapor and reboiler return stream to said reboiler, and returning the reboiled mixture to the bottom section of said fractionator, said reboiler having a substantially reduced surface area and tower elevation as compared with a directly connected column-thermosyphon system.

2. The system of claim 1 wherein said condensable vapor comprises a $C_3$ to $C_8$ hydrocarbon.

3. The system of claim 1 wherein said condensable vapor comprises steam.

4. In a process wherein liquid mixtures containing distillable components are fractionated in a fractionator column-thermosyphon reboiler system with at least one distillable component being removed as an overhead product and where a portion of the fractionator bottoms product is removed from the bottom of the fractionator and recycled as a reboiler return stream by means of a reboiler return conduit, the improvement which comprises directly injecting a condensable vapor into a vapor-actuated pumping device located upstream of said reboiler in the reboiler return conduit, said vapor-actuated pumping device comprising an eductor having in an essentially straight linear flow line an actuating fluid inlet, a mixing chamber communicating with a suction inlet, said suction inlet being transverse to the flow line of said condensable vapor stream, a diffuser chamber and a discharge outlet, wherein said condensable vapor is introduced through said actuating fluid inlet into said mixing chamber thereby inducing a region of low pressure-high velocity flow in said mixing chamber, introducing the reboiler return stream into the suction inlet of said vapor actuated pumping device transversely to the flow line of said condensable vapor by action of the suction created by said low pressure-high velocity region, mixing said condensable vapor and reboiler return stream in said mixing chamber, withdrawing the resultant mixture from said vapor-actuated pumping device at an increased velocity, and introducing the mixture of condensable vapor and reboiler return stream to said reboiler, and returning the reboiled mixture to the bottom section of said fractionator, said reboiler having a substantially reduced surface area and tower elevation as compared with a directly connected column-thermosyphon system.

5. The process of claim 4 wherein said condensable vapor is a $C_3$ to $C_8$ hydrocarbon.

6. The process of claim 4 wherein the said condensable vapor is steam.

References Cited by the Examiner

UNITED STATES PATENTS

| 2,224,925 | 12/1940 | Potts et al. | 202—47 |
| 2,224,984 | 12/1940 | Potts et al. | 202—153 X |
| 2,523,248 | 9/1950 | Heinze et al. | 202—70 X |
| 2,615,833 | 10/1952 | Dean et al. | 202—49 X |

NORMAN YUDKOFF, *Primary Examiner.*

FOLSOM E. DRUMMOND, *Assistant Examiner.*